United States Patent
Wang et al.

(10) Patent No.: US 12,293,278 B2
(45) Date of Patent: May 6, 2025

(54) SEMANTIC SEGMENTATION NETWORK MODEL UNCERTAINTY QUANTIFICATION METHOD BASED ON EVIDENCE INFERENCE

(71) Applicant: Beijing Jiaotong University, Beijing (CN)

(72) Inventors: Rui Wang, Beijing (CN); Ci Liang, Gothenburg (SE); Wei Zheng, Beijing (CN); Yumei Zhang, Beijing (CN)

(73) Assignee: Beijing Jiaotong University, Beijing (CN)

( * ) Notice: Subject to any disclaimer, the term of this patent is extended or adjusted under 35 U.S.C. 154(b) by 850 days.

(21) Appl. No.: 17/453,983

(22) Filed: Nov. 8, 2021

(65) Prior Publication Data

US 2023/0084910 A1    Mar. 16, 2023

(51) Int. Cl.
*G06N 3/048* (2023.01)
*G06F 18/21* (2023.01)

(52) U.S. Cl.
CPC ......... *G06N 3/048* (2023.01); *G06F 18/2163* (2023.01); *G06F 18/217* (2023.01)

(58) Field of Classification Search
CPC .... G06N 3/048; G06F 18/127; G06F 18/2163
USPC .......................................................... 706/15
See application file for complete search history.

(56) References Cited

U.S. PATENT DOCUMENTS

| | | | |
|---|---|---|---|
| 11,875,510 B2 * | 1/2024 | Wang | G06T 7/11 |
| 2020/0184278 A1 * | 6/2020 | Zadeh | G06N 3/044 |
| 2021/0382497 A1 * | 12/2021 | Zhi | G06V 10/26 |

OTHER PUBLICATIONS

Tong, et. al., "ConvNet and Dempster-Shafer Theory for Object Recognition", SUM 2019, Dec. 2, 2019 (Year: 2019).*

* cited by examiner

*Primary Examiner* — Tsu-Chang Lee
(74) *Attorney, Agent, or Firm* — CBM PATENT CONSULTING, LLC

(57) ABSTRACT

A semantic segmentation network model uncertainty quantification method based on evidence inference. The method comprises the steps of constructing an FCN network model, and training the FCN network model by using a training data set to obtain a trained FCN network model for semantic segmentation of image data; transplanting a D-S theory of evidence to the trained FCN network model to obtain a reconstructed FCN network model; and inputting to-be-segmented image data into the reconstructed FCN network model, outputting a classification result of a to-be-segmented image by the FCN network model, and calculating a classification result uncertainty value of each pixel point by using the D-S theory of evidence index.

8 Claims, 2 Drawing Sheets

SEMANTIC SEGMENTATION NETWORK MODEL UNCERTAINTY QUANTIFICATION METHOD BASED ON EVIDENCE INFERENCE

CROSS REFERENCES

This application claims priority to Chinese Patent Application Ser. No. 2021110118512 filed on 31 Aug. 2021.

TECHNICAL FIELD

The present invention relates to the technical field of semantic segmentation, and particularly relates to a semantic segmentation network model uncertainty quantification method based on evidence inference.

BACKGROUND ART

At present, neural networks and deep learning are widely used in various complex and intelligent systems. The confidence level output by the trusted semantic segmentation model based on neural network is very important for system decision-making. However, the opacity, inexplicability and uncertainty of Neural Network (NN) have become a huge obstacle restricting the practical application of semantic segmentation. Existing deep learning methods cannot generate probability segmentation with model uncertainty measurement, and cannot measure uncertainty, so they cannot judge the credibility of neural network decision-making.

Semantic segmentation is to identify contents and location in an image (by finding all the pixels belong to it). Semantic segmentation is a typical computer vision problem, and relates to the operation of taking some original data (such as plane image) as input and transforming them into new data with highlighted regions of interest. Semantic segmentation is a classification at the pixel level, and pixels belonging to the same class are classified into one category.

D-S Theory of evidence (Dempster-Shafer Theory of Evidence), also called as D-S theory, was obtained at the earliest by Dempster in utilizing upper and lower limit probabilities to solve multi-value mapping problem, he tried to describe uncertainty by using a probability range instead of a determined probability value. Theory of evidence expanded the single-point assignment of events in probability theory to assign values to event set, which weakened the corresponding axiom system and met the requirement of being weaker than the probability, and the theory of evidence can be regarded as a generalized probability theory.

In order to better understand the D-S theory of evidence, a combination rule among a sample space, basic functions and evidences of the D-S theory of evidence is described as follows.

a. Sample Space $\theta$ is set as a finite set of all possible values of a variable X, it also known as the sample space, the elements in $\theta$ are mutually exclusive, and the set formed by all the subsets of in $\theta$ is called as a power set denoted as $2^\theta$ When the number of elements in $\theta$ is N, the number of elements in the power set is $2^N$.

(2) Basic Functions

In the D-S theory of evidence, there are three important concepts: basic probability assignment function (mass), belief function (belief) and plausibility function (plausibility), which are introduced separately below.

i. Basic Probability Assignment Function (Mass)

The basic probability assignment on the sample space $\theta$ is to map any subset of $\theta$ to the function m on [0, 1], which is called the mass function and meets the Formula (2-1).

$$\begin{cases} m(\phi) = 0 \\ \sum_{A \subseteq \Theta} m(A) = 1 \end{cases} \quad (2\text{-}1)$$

Meanwhile, m is called the probability assignment function on $2^\theta$, m(A) is called the basic probability number of A, and m(A) represents the degree of belief in the hypothesis set A based on the current evidence.

2) Belief Function (Belief)

The belief function based on the basic probability assignment function in the sample space $\theta$ is defined as: for any A contained in the $\theta$, all meet the Formula (2-2).

$$a.\ Bel(A) = \sum_{B \subseteq A} m(B) \quad (2\text{-}2)$$

Bel(A) represents the degree of belief in hypothesis A under the current evidence. The value of Bel(A) is equal to the sum of the basic probabilities of all subsets of A.

3) Plausibility Function (Plausibility)

The plausibility function based on the basic probability assignment function in the sample space $\theta$ is defined as: for any A contained in the $\theta$, all meet the Formula (2-3).

$$Pl(A) = 1 - Bel(\overline{A}) \quad \text{a.}$$

Since the belief function Bel(A) represents the degree of belief in that A is true, $Bel(\overline{A})$ represents the degree of belief in that A is false, so Pl(A) represents the degree of belief in that A is not false, and the plausibility function is also called as an irrefutable function or an upper limit function.

(3) Combination Rule of Evidences

In practical problems, for the same evidence, due to different sources, different probability assignment functions may be obtained. At this time, under the framework of the D-S theory of evidence, two independent mass functions can be fused by orthogonal sum. It is assumed that $m_1$ and $m_2$ are two different probability assignment functions, the fusion formula is Formula (2-4).

$$a.\ m(A) = (m_1 \oplus m_2)(A) = \frac{1}{1-F} \times \sum_{x \cap y = A} m_1(x) \times m_2(y) \quad (2\text{-}4)$$

The calculation method of F value is shown in Formula (2-5):

$$a.\ F = \sum_{x \cap y = \phi} m_1(x) \times m_2(y) = 1 - \sum_{x \cap y \neq \phi} m_1(x) \times m_2(y) \quad (2\text{-}5)$$

When $F \neq 0$, the orthogonal sum m is also a probability assignment function, and when F=0, there is no orthogonal sum m, and at this time, it is called conflict between $m_1$ and $m_2$.

At present, the D-S theory of evidence is widely applied to statistical pattern recognition, and the research direction includes classifier fusion, evidence calibration and classifier design. In the field of classifier design, Denoeux proved that a polynomial logistic regression model and nonlinear expansion (namely a neural network classifier) thereof can transform the features of an input layer or a higher layer into a D-S quality function based on the D-S theory of evidence, and then information inference is carried out by utilizing the combination rule of the D-S theory of evidence, thereby assisting in accurate decision based on uncertainty information.

In a multi-classification decision problem, it is assumed that there is a category set $\Theta=\{\theta_1, \ldots, \theta_K\}$, K represents the number of categories, and the categories are independent of one another; and a feature set is $\Phi(x)=\{\varphi_1(x), \ldots, \varphi_J(x)\}$, J represents the number of features, and the features are independent of one another. A traditional classifier generally learns features $\varphi_j(x)$ and parameters $\beta_{0k}$ and $\beta_k$ by minimizing the loss function, then maps the input into a real number between 0 and 1 by using softmax, then outputs a discrimination probability for each category, and ensures that the sum is 1 through normalization. FIG. 1 shows a structure of the traditional classifier.

A D-S classifier transforms the input or the feature output of high-level neurons into a quality function, then performs combination calculation and plausibility transformation, and finally outputs a degree of belief in each category. FIG. 1 is a structure diagram of the D-S classifier in the prior art. In case of only considering the output classification, the two are equivalent, but a D-S view decision lays a potential quality function, compared with probability output, normalized combined quality function output has a larger information amount, and in the process of feature combination, conflict among features and ignored information amounts can be calculated.

When combination operation between evidences is carried out, the weight of the evidence is defined as w, and the calculation formula is Formula (2-6), wherein $\beta_{jk}^*$ and $\alpha_{jk}^*$ are two coefficients.

$$\text{a. } w_{jk} = \beta_{jk}^* \phi_j(x) + \alpha_{jk}^*, \quad (2\text{-}6)$$

$$\text{wherein:} \beta_{jk}^* = \hat{\beta}_{jk} - \frac{1}{K}\sum_{l}^{K}\hat{\beta}_{jl},$$

$$\alpha_{jk}^* = \frac{1}{J}\left(\beta_{0k}^* + \sum_{l}^{K}\beta_{jk}^*\mu_j\right) - \beta_{jk}^*\mu_j,$$

$$\beta_{0k}^* = \hat{\beta}_{0k} - \frac{1}{K}\sum_{l}^{K}\hat{\beta}_{0l}$$

In the Formula (2-6), $\mu_j$ is the mean value of the feature set $\varphi_j(x)$.

F is used to represent the conflict value between the evidences, the calculation formula is Formula (2-7), and the calculation methods of $\eta^+$ and $\eta^-$ see Formula (2-8) and Formula (2-9).

$$\text{a. } F = \sum_{k=1}^{K}\{\eta^+(\exp(w_k^+)-1)[1-\eta^-\exp(-w_k^-)]\} \quad (2\text{-}7)$$

$$\text{b. } \eta^+ = \frac{1}{\sum_{l=1}^{K}\exp(w_k^+) - K + 1} \quad (2\text{-}8)$$

$$\text{c. } \eta^- = \frac{1}{1 - \prod_{l=1}^{K}[1 - \exp(-w_l^-)]} \quad (2\text{-}9)$$

Wherein $w_k^+$ represents positive correlation support of the total weight of the evidences, and $w_k^-$ represents negative correlation support.

$m(\{\theta_k\})$ is used to represent the total confidence of the classification $\{\theta_k\}$ calculated according to the combination rule of the DS theory of evidence, wherein the calculation formula is Formula (2-10), wherein $\eta=(1-F)^{-1}$.

$$\text{a. } m(\{\theta_k\}) = \quad (2\text{-}10)$$
$$\eta \cdot \eta^+ \cdot \eta^- \cdot \exp(-w_k^-) \cdot \left\{\exp(w_k^+) - 1 + \prod_{l \neq k}[1 - \exp(-w_l^-)]\right\}$$

$m(\Theta)$ is used to represent the degree of belief that cannot be assigned, and the calculation formula is Formula (2-11).

$$\text{a. } m(\Theta) = \eta \cdot \eta^+ \cdot \eta^- \cdot \exp\left(-\sum_{k=1}^{K}w_k^-\right) \quad (2\text{-}11)$$

In the process of performing evidence combination by using the D-S theory of evidence, the F value can represent the conflict between evidences, $m(\theta)$ can represent the degree of belief that cannot be assigned, and these values can assist in understanding the uncertainty of deep neural networks and play a good guiding role in the aspect of test data generation work.

Quantitative research on the neural network semantic segmentation predictive result uncertainty first began with Bayesian Neural Networks (BNN). Researchers pioneered the use of probability assignment to replace point estimation of parameters in the model training process, not only the predictive result can be obtained through training of the neural networks, but also the probability assignment of the parameters can be obtained, namely the uncertainty of the predictive result was estimated. However, the use of BNN models faced difficult challenge when selecting proper prior assignment or performing accurate inference on posterior parameters. Subsequently, some researchers proposed a series of approximate inference methods called as variational inference, namely, it was assumed that there is a group of posterior assignment $q(\omega)$, the KL divergence (Kullback-Leibler Divergence) between $q(\omega)$ and real posterior $p(\omega)$ is minimized to find out approximate parameter posterior assignment $\hat{q}(\omega)$. However, the problem of overlarge calculated amount cannot be avoided by the earliest variational inference method and the variational inference introducing a new approximate method, such as sampling-based variational inference and random variational inference. In order to measure the predication uncertainty, the number of parameters even needed to be doubled for the network model of the same scale.

In order to avoid the problem of excessive calculation amount caused by the Bayesian neural networks, researchers in recent years has successively proposed a non-Bayesian method to quantitatively evaluate the uncertainty of the neural networks. Gal and Ghahramani proved that for any nonlinear neural network, the model of adding dropout operation before all parameter layers (a certain proportion of hidden node output values were randomly discarded to prevent a model from being overfitting) is mathematically equivalent to the approximation (approximate marginalized hidden space) of a probability depth Gaussian process; and the optimization target (loss function and L2 regularization)

of model training was actually KL divergence between the approximate assignment of the minimization hypothesis and the real posteriori of the depth Gaussian process. Finally, a Monte Carlo sampling was utilized, the dropout operation was also used in the test stage to simulate T random forward calculation, then the average value and the variance estimation value of each output node were obtained, that is, the uncertainty of a predictive result was obtained, and therefore the method was also called MC dropout.

At present, Bayesian Deep Learning (BDL) developed based on the method is used for uncertainty modeling, and it provides uncertainty estimation on the basis of a Deep Learning architecture. These deep structures can model complex tasks by utilizing the layer representation capability of deep learning, and complex multi-modal posterior assignment can be inferred. The Bayesian Deep Learning model usually forms uncertainty estimation by placing assignment on the model weight or obtaining direct mapping of probability output through learning.

However, the Bayesian Deep Learning method based on the above technology has the defects that the problems of difficulty in weight assignment estimation and extremely large calculation amount generally exist. A plurality of predictive results can be obtained only by performing large-scale model inference based on the improved MC Dropout method, and then a predictive variance, namely uncertainty, can be calculated. Moreover, when the Bayesian Learning method is combined with the neural networks, due to that the neural networks have a very large parameter quantity, and a large amount of model inference of the Bayesian Learning method is performed, the calculation amount is very large, and inference calculation of the semantic segmentation uncertainty cannot be effectively completed in a short time.

SUMMARY OF THE PRESENT INVENTION

The embodiment of the present invention provides a semantic segmentation network model uncertainty quantification method based on evidence inference, aiming at effectively performing quantitative calculation on semantic segmentation uncertainty.

In order to achieve the above purpose, the present invention adopts the following technical solutions.

The semantic segmentation network model uncertainty quantification method based on evidence inference comprises the following steps:

Constructing an FCN network model, and training the FCN network model by using a training data set to obtain a trained FCN network model for semantic segmentation of image data;

Transplanting a D-S theory of evidence to the trained FCN network model to obtain a reconstructed FCN network model; and Inputting image data to be segmented into the reconstructed FCN network model, outputting a classification result of an image to be segmented by the FCN network model, and calculating a classification result uncertainty value of each pixel point by using a D-S theory of evidence index.

Preferably, the step of constructing the FCN network model comprises that:

Up sampling/deconvolution operation is performed on feature maps reduced by a convolutional layer and a pooling layer in a convolutional neural network to realize recovery of feature space information and obtain a fully convolutional network FCN network model, and parameters of the FCN network model are trained, wherein the parameters of the FCN network model include an activation value of the feature map and the weight of a filter, parameter layers of the FCN network model are all convolutional layers, the size of a convolution kernel of the last convolutional layer is 1*1, and a fully connected layer of the FCN network model is not used for executing an image segmentation task.

Preferably, the step of training the FCN network model by using the training data set to obtain the trained FCN network model for semantic segmentation of image data comprises that:

A known original image data set and label data are obtained, wherein preprocessed images in the original image data set are the same in size m*n, the training data set is formed through the original image data set and the label data, the training data set is input into the FCN network model, and parameters of an optimized classification model are automatically calculated through a loss function to obtain the trained FCN network model used for semantic segmentation of the image data.

Preferably, the step of transplanting the D-S theory of evidence to the trained FCN network model to obtain the reconstructed FCN network model comprises that:

The D-S theory of evidence is transplanted to the trained FCN network model, and an original evidence pool $m_{jk}$ is obtained through calculation based on the D-S theory of evidence; and then a Dempster combination rule is applied to the original evidence pool $m_{jk}$, confidence $m_1$ and uncertainty measurement indexes of K categories are obtained by calculation, wherein the uncertainty measurement indexes are used for evaluating uncertainty of a predictive result, plausibility transformation is performed on the confidence $m_1$ of the K categories to obtain a normalized plausibility function $P_m$, and an output result $P(C_k)$ of the FCN network model is equivalent to the plausibility function $P_m(C_k)$ obtained based on an evidence inference method so as to obtain the reconstructed FCN network model.

Preferably, the step of inputting to-be-segmented image data into the reconstructed FCN network model, and outputting the classification result of to-be-segmented image by the FCN network model comprises that:

The to-be-segmented image data is input into the reconstructed FCN network model, in case of assuming to segment the to-be-segmented image data into K+1 categories and adding a 'background' category, the last convolutional layer of the FCN network model is set to include K filters, and the size and the number of channels of the last layer of feature maps of the FCN network model are set into $n_H$, $n_W$ and $n_C$ respectively;

Semantic segmentation is performed on the to-be-segmented image data through the reconstructed FCN network model, an activation value $\varphi(X)$ is extracted from the last group of feature maps of the FCN network model, wherein $\varphi(X)$ is an activation value of J dimension ($J=n_H*n_W*n_C$), and meanwhile, the weight w and the bias b of the filter of the last convolutional layer of the FCN network model are extracted; an original evidence pool $m_{jk}$ are calculated through the activation value $\varphi(X)$, the weight w and the bias b;

The Dempster combination rule is applied to the original evidence pool $m_{jk}$, and the confidence $m_1$ of the K categories is obtained by calculation, wherein the output result $P(C_K)$ of the FCN network model is as follows:

$$i.\ P(C_K) = \text{softmax}(w*\varphi(X)+b) \quad (1\text{-}19)$$

Predictive data of $N*n_H*n_W*n_C*(K+1)$ dimension is obtained, wherein N is the number of input picture samples, $n_H$, $n_W$ and $n_C$ are the size: height, width and number of color channels of an original picture respectively, and K is the classification number of categories.

Preferably, the step of calculating the classification result uncertainty value of each pixel point by using the D-S theory of evidence index comprises:

All activation values φ(X) of the last layer of feature maps of the FCN model and the weight w and bias b of the filter obtained by training are extracted, wherein in the D-S theory of evidence, the conflict represents the conflict degree between evidences, and a calculation method of the conflict F between two evidences $m_1$ and $m_1$ sees Formula (2-5);

$$a. F = \sum_{x \cap y = \phi} m_1(x) \times m_2(y) = 1 - \sum_{x \cap y \neq \phi} m_1(x) \times m_2(y) \quad (2\text{-}5)$$

When F≠0, the orthogonal sum m is also a probability assignment function, and when F=0, there is no orthogonal sum m, and at this time, it is called conflict between $m_1$ and $m_2$;

The calculation method of the conflict F of the final segmentation result of the to-be-segmented image data sees (2-7), (2-8) and (2-9);

$$a. F = \sum_{k=1}^{K} \{\eta^+(\exp(w_k^+) - 1)[1 - \eta^- \exp(-w_k^-)]\} \quad (2\text{-}7)$$

$$b. \eta^+ = \frac{1}{\sum_{i=1}^{K} \exp(w_k^+) - K + 1} \quad (2\text{-}8)$$

$$c. \eta^- = \frac{1}{1 - \prod_{i=1}^{K} [1 - \exp(-w_i^-)]} \quad (2\text{-}9)$$

Wherein $w_k^+$ represents positive correlation support of the total weight of the evidences, and $w_k^-$ represents negative correlation support.

Preferably, the step of calculating the classification result uncertainty value of each pixel point by using the D-S theory of evidence index further comprises:

Information ignorance m($\mathcal{C}$) refers to the basic probability of assigning the complete set $\mathcal{C}$, and the calculation method of m($\mathcal{C}$) is:

$$a. (m_1 \oplus m_2)(\mathcal{C}) = \frac{1}{1-F} \Sigma_{p \cap q = \varepsilon} m_1(p) m_2(q) \quad (2\text{-}13)$$

When m($\mathcal{C}$)=1, the proposition is completely unknown; and

The information Ignorance degree m(Θ) of the final segmentation result of the to-be-segmented image data represents the belief degree that cannot be assigned, and the calculation formula sees Formula (2-11).

$$a. m(\Theta) = \eta \cdot \eta^+ \cdot \eta^- \cdot \exp\left(-\sum_{k=1}^{K} w_k\right) \quad (2\text{-}11)$$

Wherein $\eta=(1-F)^{-1}$, $\eta^+$ and $\eta^-$ refer to Formulas (2-8) and (2-9).

Preferably, the step of calculating the classification result uncertainty value of each pixel point by using the D-S theory of evidence index further comprises:

Total uncertainty entropy is used for measuring the uncertainty of the neural network, which is defined as follows:

$$a. H(m) = \quad (2\text{-}14)$$
$$H_s(\text{pl\_P}_m) + H_d(m) = \Sigma \text{pl\_P}_m(x) \log\left(\frac{1}{\text{pl\_P}_m(x)}\right) + \Sigma m(a) \log(|a|)$$

$$b. \text{pl\_P}_m(x_i) = \frac{pl(x_i)}{\sum_{i=1}^{K} pl(x_i)} \quad (2\text{-}15)$$

$$c. m(a) = \eta \cdot \eta^+ \cdot \eta^- \cdot \prod_{\theta_k \in a}[1 - \exp(-w_i^-)] \cdot \prod_{\theta_k \notin a}[\exp(-w_i^-)] \quad (2\text{-}16)$$

Wherein, (2-15) and (2-16) are substituted in the Formula (2-14), and the result shows that |a| is the number of elements in subset a; pl_$P_m$(x) is the probability mass function, the calculation method sees Formula (2-15), pl($x_i$) is the plausibility function; m(a) is the mass function of the subset of set $\mathcal{C}$, the calculation method is shown in Formula (2-16), $\eta=(1-F)^{-1}$; and m({$\theta_k$}) is used to represent the total confidence of the category {$\theta_k$} calculated according to the combination rule of DS theory of evidence, wherein the calculation formula is Formula (2-10), $\eta=(1-F)^{-1}$;

$$a. m(\{\theta_k\}) = \quad (2\text{-}10)$$
$$\eta \cdot \eta^+ \cdot \eta^- \cdot \exp(-w_k^-) \cdot \left\{\exp(w_k^+) - 1 + \prod_{i \neq k}[1 - \exp(-w_i^-)]\right\}$$

Wherein $\eta=(1-F)^{-1}$, $\eta^+$ and $\eta^-$ refer to Formulas (2-8) and (2-9).

The first part $H_s$(pl_$P_m$) is the Shannon entropy corresponding to bpa, and the second part $H_d$(m) calculates the sum of the uncertain entropy assigned to the basic probability of the non-single element set; and the sum of the measurement value of the two parts is the total uncertainty entropy of the neural network for one sample predictive result, which is used to measure the uncertainty of the model predictive result.

The present invention is based on the DS evidence theory and adopts the method of evidence reasoning to extract predictive uncertainty (predictive uncertainty) information from the Fully Convolutional Network (FCN) model used for semantic segmentation; using the structure of the full convolutional network Features: Evidence classifiers used in neural networks or Multilayer Perceptron (MLP) are migrated to fully convolutional networks for image semantic segmentation, such as FCN, SegNet, U-Net; the present invention classifies evidence The combination of a full convolutional network used for image semantic segmentation is a method for quantifying model prediction uncertainty and assisting decision-making based on DS evidence theory; the present invention solves how to quantify the uncertainty of the semantic segmentation model output, how to Evaluate the uncertainty of the semantic segmentation model and how to quantify the credibility of the decision-making of the semantic segmentation model. The method of the present invention can obtain the quantified value of uncertainty through only one model inference, which can be used to improve the reliability of the output result and assist the safety decision-making of the system; compared with the prior art, the present invention can effectively complete the matching in a short time. The quantitative calculation of the uncertainty of semantic segmentation greatly improves the calculation efficiency and saves time and resource costs.

According to the technical solution provided by the present invention, quantification calculation of semantic segmentation uncertainty can be effectively completed within short time so that calculation efficiency can be greatly enhanced, and time and resource cost can be saved.

The present invention can be used in all fields related to computer vision, deep learning, neural network prediction, etc.; for example, autonomous driving, drones, meta-universe, virtual reality (VR), augmented reality (AR), In other fields, the uncertainty of the output of the semantic segmentation model can be quantified, the uncertainty of the semantic segmentation model can be evaluated, and the credibility of the decision of the quantified semantic segmentation model can be quantified, so that the output image boundary is more accurate and more consistent with the real world.

The additional aspects and advantages of the present invention will be partly given in the following description, which will become obvious from the following description, or be understood through the practice of the present invention.

BRIEF DESCRIPTION OF THE DRAWINGS

In order to explain the technical solutions of the embodiments of the present invention more clearly, the following will briefly introduce the drawings used in the description of the embodiments, obviously, the drawings in the following description are only some embodiments of the present invention, and for those of ordinary skill in the art, without creative work, other drawings can be obtained based on these drawings.

DETAILED DESCRIPTION OF THE PRESENT INVENTION

Figure 1:
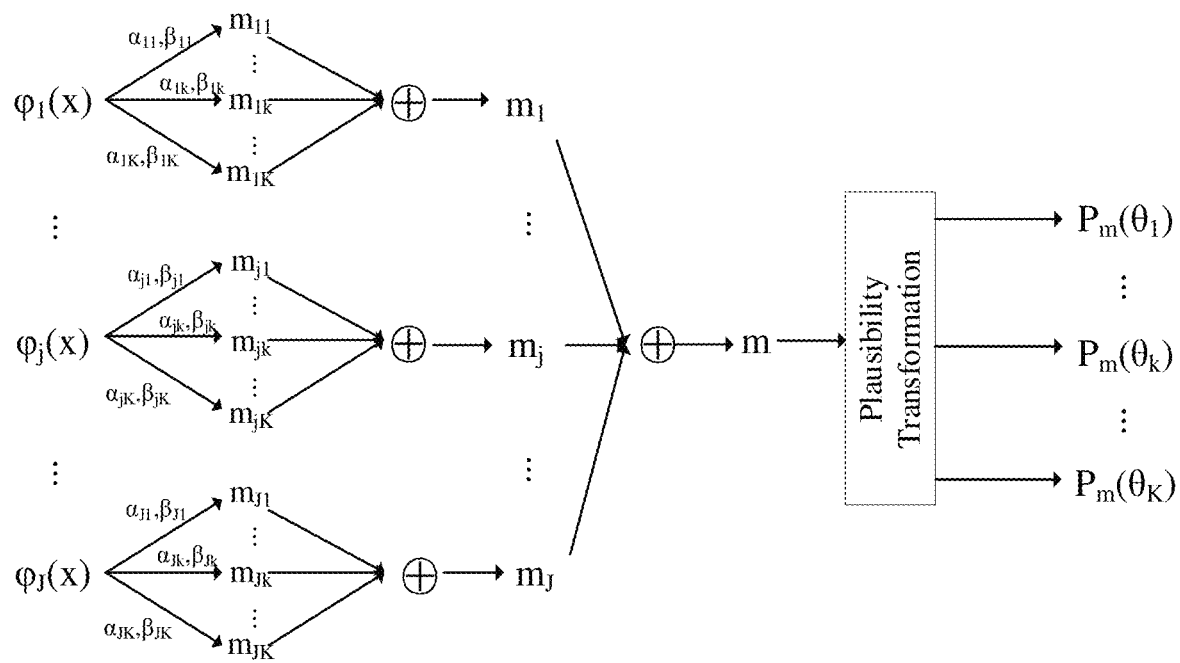
FIG. 1 is a structural diagram of a D-S classifier in the prior art.

The following describes the embodiments of the present invention in detail. Examples of the embodiments are shown in the drawings, in which the same or similar reference numerals indicate the same or similar elements or elements with the same or similar functions. The embodiments described below with reference to the drawings are exemplary, and are only used to explain the present invention, and cannot be construed as limiting the present invention.

Those skilled in the art can understand that, unless specifically stated otherwise, the singular forms "a", "an", "said" and "the" used herein may also include plural forms. It should be further understood that the term "comprising" used in the specification of the present invention refers to the presence of the described features, integers, steps, operations, elements and/or components, but does not exclude the presence or addition of one or more other features, integers, steps, operations, elements, components, and/or groups of them. It should be understood that when we refer to an element as being "connected" or "coupled" to another element, it can be directly connected or coupled to the other element, or intervening elements may also be present. In addition, "connection" or "coupling" as used herein may include wireless connection or coupling. The term "and/or" as used herein includes any unit and all combinations of one or more of the associated listed items.

Those skilled in the art can understand that, unless otherwise defined, all terms (including technical and scientific terms) used herein have the same meanings as those commonly understood by those of ordinary skill in the art to which the present invention belongs. It should also be understood that terms such as those defined in general dictionaries should be understood to have meanings consistent with the meanings in the context of the prior art, and unless defined as here, they will not be used in idealized or overly formal meanings to explain.

In order to facilitate the understanding of the embodiments of the present invention, several specific embodiments will be taken as examples for further explanation and description in conjunction with the drawings, and each embodiment does not constitute a limitation to the embodiments of the present invention.

According to the embodiment of the present invention, based on a D-S theory of evidence, an evidence inference method is adopted to extract predictive uncertainty information from a Fully Convolutional Network (FCN) model (such as SegNet, Unet) used for semantic segmentation. Specifically, a corresponding quality function $m_{jk}$ is calculated through activation values of the last group of feature maps of the FCN model and a parameter value of a convolutional layer, and then two types of predictive result uncertainties capable of distinguishing 'lack of features' and 'feature conflicts' are obtained by inference for decision assistance.

Figure 2:
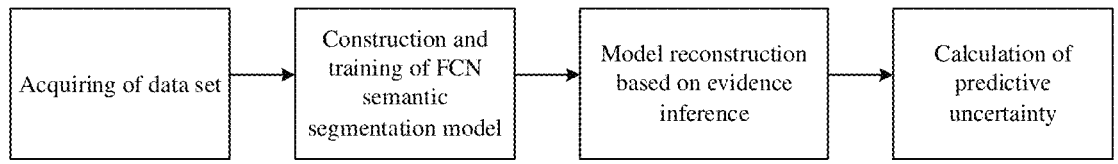
FIG. 2 is a processing flow diagram of a semantic segmentation network model uncertainty quantification method based on evidence inference provided by an embodiment of the present invention.
Figure 3:
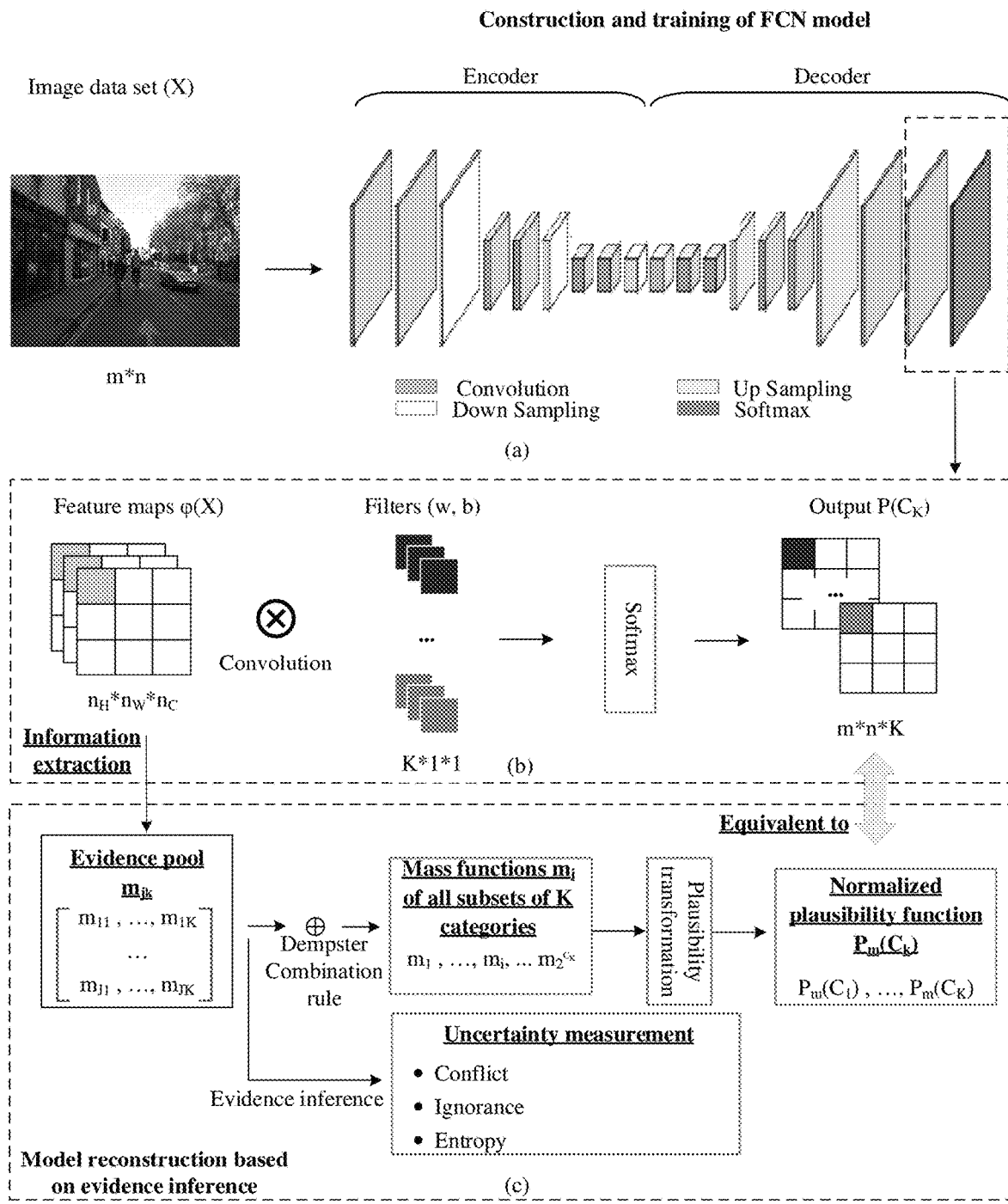
FIG. 3 is a schematic diagram of a realization principle of a semantic segmentation network model uncertainty quantification method based on evidence inference provided by an embodiment of the present invention.

The embodiment of the present invention provides a schematic diagram of a realization principle of a semantic segmentation network model uncertainty quantification method based on evidence inference as shown in FIG. 3, and the specific processing flow is shown in FIG. 2 and comprises the following steps:

Step S10, obtaining an original training set:

An original image data set and label data are obtained, wherein preprocessed images in the original image data set are m*n with the same scale, wherein a CamVid data set is taken as an example and is shown in FIG. 3 (a); and the original image data set and the label data form a training data set which is used for training an FCN network model.

Step S20, constructing the FCN network model, and training the FCN network model by utilizing the training data set to obtain a trained FCN network model for semantic segmentation of image data.

A classification model based on Convolutional Neural Networks (CNN) is generally ended by a plurality of fully connected layers, which may cause that an original two-dimensional matrix (image) is flattened into one dimension, spatial information is lost, and finally a scalar, namely a classification label, is output by training. The output of image semantic segmentation is a two-dimensional segmentation image, and in order to obtain a segmentation image with the same size as an original image, the feature maps reduced by a convolutional layer and a pooling layer in the convolutional neural networks is subjected to up sampling/deconvolution operation to realize recovery of feature space information. The model for transforming the fully connected layer of the CNN network into an up sampling layer/deconvolution layer is collectively called a fully convolutional network FCN network model. In order to realize the method, a semantic segmentation network model shown in FIG. 3 (a) needs to be built, parameters of the semantic segmentation network model are trained, and the size of a convolution kernel of the last semantic segmentation network model convolution layer is required to be 1*1 (the convolution kernel is equivalent to the fully connected layer in numerical calculation, and a foundation is laid for uncertain information inference).

In the embodiment of the present invention, all parameter layers in the neural networks in the FCN are convolutional layers, and the fully connected layer is not used to perform image segmentation tasks. The parameters of FCN include the activation value of the feature maps and the weight of the filter.

The training data set is input into the FCN network model, the parameters of an optimized classification model are automatically calculated through a loss function, thus obtaining the trained FCN network model. The trained FCN network model is the semantic segmentation network model of image data in the embodiment of the present invention.

Step S30, transplanting a D-S theory of evidence system to the FCN network model to obtain a reconstructed FCN network model.

Firstly, in the D-S theory of evidence system, the degree of belief in a proposition is measured through basic probability assignment (hereinafter referred to as bpa), and the bpa is also referred to as a mass function and is defined as that for a finite set $\mathcal{C} = \{C1, \ldots, CK\}$, the mass function of the set $\mathcal{C}$ is mapped from a power set of the $\mathcal{C}$ to an interval [0, 1]: $2^{\mathcal{C}} \to [0,1]$, and it meets $\Sigma_{A \subseteq \mathcal{C}} m(A) = 1$.

Wherein, a subset A, meeting $m(A)>0$, in the power set $2^{\mathcal{C}}$ is called as a focus set; the bpa meeting the following form is called as (simple) bpa: $m(A)=s$, $m(\mathcal{C})=1-s$. For the simple bpa, a variable $\omega = -\ln(1-s)$ is called as the weight of evidence. Thus, the simple bpa can be expressed as $A^{\omega}$ through the weight w of the evidence.

For solving image segmentation based on FCN, it is assumed that the target category of each pixel point is $\mathcal{C} = \{C_1, \ldots, C_K\}$, and $\varphi(X)$ is a J-dimensional ($J=n_H*n_W*n_C$) activation value of the last layer of feature maps (featuremaps); each $\varphi_j(x)$ feature value (activation value) is taken as an evidence supporting a classification result $Y \in \mathcal{C}$; and it is defined that whether an evidence $\varphi_j(x)$ supports input samples to be classified into $C_k$ depends on the symbol of the following weight values:

$$i.\ \omega_{jk} := \beta_{jk} \cdot \varphi_j(x) + \alpha_{jk} \quad (2\text{-}17)$$

Wherein, $k=1, \ldots, K$, $j=1, \ldots, J$, $\beta_{jk}$ and $\alpha_{jk}$ are parameters; when the weight value $\varphi_{jk}>0$, this evidence supports that the sample belongs to a subset $\{C_k\}$, and the evidence weight (support degree) is equal to $\omega_{jk}^{+} := \max(0, \{_{jk}\})$; when the weight value $\omega_{jk}<0$, this evidence supports that the sample belongs to a complementary set $\{\overline{C_k}\}$ of $\{C_k\}$, and the evidence weight (support degree) is equal to $\omega_{jk}^{-} := \max(0, -\omega_{jk})$. Therefore, the output value $\varphi_j(x)$ of each neuron has two simple bpa;

$$a.\ M_{ji}^{+} := \{C_k\}^{\omega_{jk}^{+}} \text{和} m_{ji}^{-} := \{\overline{C_k}\}^{\omega_{jk}^{-}} \quad (2\text{-}18)$$

Therefore, for J feature values (activation values) and K target categories, J×K×2 evidences can be extracted to form an 'original evidence pool $m_{jk}$' (as shown in FIG. 3 (c)).

The confidence $m_1$ of J feature values (activation values) to K categories is obtained through a Dempster combination rule in the D-S theory of evidence system. Finally, a normalized plausibility function $P_m(C_k)$ for the K categories is obtained through a series of evidence inference such as plausibility transformation. The plausibility function is equivalent to a predicted probability value obtained through linear calculation of the neural network fully connected layer and normalization processing of a softmax function. The above method is further transplanted into the FCN network model, and the output result $P(C_k)$ of the FCN network model is equivalent to the plausibility function $P_m(C_k)$ obtained based on the evidence inference method.

FIG. 3(c) describes a complete process of applying (transplanting) the D-S theory of evidence system to the FCN network, namely, the original evidence pool $m_{jk}$ is obtained through calculation based on the D-S theory of evidence, then the Dempster combination rule is applied to the original evidence pool $m_{jk}$, confidence $m_1$ of K categories and uncertainty measurement indexes, namely, Conflict, Ignorance and Entropy, are obtained by calculation. The uncertainty measurement indexes are used for evaluating uncertainty of the predictive result.

The confidence $m_1$ of the K categories is subjected to plausibility transformation to obtain the normalized plausibility function $P_m$. The demonstration shows that the $P_m$ is equivalent to the output of the standard FCN, which proves that it is completely feasible to transplant the D-S theory of evidence system to the FCN network. According to the method, combining the D-S theory of evidence system with the FCN and providing the uncertainty measurement indexes are expansion of the D-S theory of evidence system.

Step S40, inputting the to-be-segmented image data into the reconstructed FCN network model, outputting the classification result of each pixel point in the to-be-segmented image by the FCN network model, and calculating the classification result uncertainty value of each pixel point by using the D-S theory of evidence index.

The to-be-segmented image data are input into the reconstructed FCN network model, it is assumed that the image needs to be segmented into K+1 categories, a 'background' category is added, and K filters are required for the last convolutional layer of the FCN network model; and the last two layers (the convolutional layer and a softmax output layer) of the network are unfolded as shown in FIG. 3 (b), the size and the channel number of the last layer of feature maps are $n_H$, $n_W$ and $n_C$ respectively, and $\varphi(X)$ is the activation value (output value) of the feature maps.

The parameters and steps required for semantic segmentation of the reconstructed FCN network model are as follows:

1, Extracting the activation value $\varphi(X)$ from the last group of feature maps of the FCN network model, wherein $\varphi(X)$ is the activation value of J dimension ($J=n_H*n_W*n_C$), and extracting the weight w and the bias b of the filter of the last convolutional layer of the FCN;

2, Calculating to obtain the original evidence pool $m_{jk}$ by utilizing the activation value $\varphi(X)$, the weight w and the bias b obtained in the step 1; and 3, Applying the Dempster combination rule to the original evidence pool $m_{jk}$, and calculating to obtain confidence $m_1$ of K categories and uncertainty measurement indexes, namely, Conflict, Ignorance and Entropy.

The output result $P(C_K)$ of the FCN network model can be expressed as follows in brief:

$$i.\ P(C_K) = \text{softmax}(w*\varphi(X)+b) \quad (2\text{-}19)$$

By trained model inference calculation, predictive data of $N*n_H*n_W*n_C*(K+1)$ dimension is obtained, wherein N is the number of input picture samples, $n_H$, $n_W$ and $n_C$ are the size: height, width and number of color channels of an original picture respectively, and K is the classification number of categories.

All activation values φ(X) of the last layer of feature maps and the weight w and the bias b of the filter obtained by training are extracted, and the uncertainty values of predictive results of the following three models are calculated.

The following three parameters, namely, Conflict F, information Ignorance m ($\mathcal{C}$) and uncertainty entropy H(m) and are used for evaluating uncertainty of the final segmentation result of the image. The FCN network model can only output a classification result of each pixel point, namely an image segmentation result, but the result may be wrong, the original model cannot judge the authenticity of the result, especially for a safety key system, the predictive result needs to be judged through other indexes. The three indexes can judge the uncertainty of the classification result of each pixel point, namely the uncertainty of the segmentation result, for example, under the condition that the three indexes are very high, the predictive result can be selected to be not believed or discarded.

Information conflict (Conflict): the Conflict is used for representing the conflict degree between evidences in the D-S theory of evidence, and for bpa representing two evidences, the Conflict between $m_1$ and $m_2$ is defined as (2-5). The indexes are used for calculating orthogonal sum of the support degree of each evidence on a repellent proposition, aiming at measuring the mutual conflict degree among different evidences. Therefore, F of the final image segmentation result can be obtained by inference according to Formula (2-7).

In the D-S theory of evidence, the Conflict is used for representing the conflict degree between the evidences, and the calculation method of the Conflict F between the two evidences $m_1$ and $m_2$ is the Formula (2-5).

$$a.\ F = \sum_{x \cap y = \emptyset} m_1(x) \times m_2(y) = 1 - \sum_{x \cap y \neq \emptyset} m_1(x) \times m_2(y) \quad (2\text{-}5)$$

$m_1$ is the mass function of an evidence 1, and $m_2$ is the mass function of an evidence 2.

When F≠0, the orthogonal sum m is also a probability assignment function, when F=0, there is no orthogonal sum m, and it is called the conflict between $m_1$ and $m_1$;

The calculation method of the Conflict F of the final segmentation result of the to-be-segmented image data sees (2-7), (2-8) and (2-9)

$$a.\ F = \sum_{k=1}^{K} \{\eta + (\exp(w_k^+) - 1)[1 - \eta^- \exp(-w_k^-)]\} \quad (2\text{-}7)$$

$$b.\ \eta^+ = \frac{1}{\sum_{l=1}^{K} \exp(w_l^+) - K + 1} \quad (2\text{-}8)$$

$$c.\ \eta^- = \frac{1}{1 - \prod_{l=1}^{K}[1 - \exp(-w_l^-)]} \quad (2\text{-}9)$$

$w_k^+$ represents positive correlation support of the total weight of the evidences, $w_k^-$ represents negative correlation support, K is the number of classification categories, $\eta^+$ and $\eta^-$ are the intermediate variables of the inference formula.

The information conflict of the activation value of the feature maps to the predictive result, that is, the degree to which a set of activation values support different classification results, is accurately calculated.

Information ignorance (Ignorance): Information ignorance refers to the basic probability of assigning the complete set $\mathcal{C}$, namely m($\mathcal{C}$), which is defined as:

$$a.\ (m_1 \oplus m_2)(\mathcal{C}) = \frac{1}{1-F} \Sigma_{p \cap q = \mathcal{C}} m_1(p) m_2(q) \quad (2\text{-}13)$$

When m($\mathcal{C}$)=1, the proposition is completely unknown, similarly, the information ignorance m(Θ) of the final segmentation result of the to-be-segmented image data is obtained by inference according to Formula (2-11), and then the information ignorance of the activation value of each sample to the predictive result, namely, the degree that a set of activation value lacks of effective information to determine the classification result, is accurately calculated.

m(Θ) is used to represent the degree of belief that assignment cannot be performed, and the calculation formula is Formula (2-11).

$$a.\ m(\Theta) = \eta \cdot \eta^+ \cdot \eta^- \cdot \exp\left(-\sum_{k=1}^{K} w_k^-\right) \quad (2\text{-}11)$$

Wherein, $\eta=(1-F)^{-1}$, $w_k^-$ represents negative correlation support, K is the number of classification categories, $\eta$, $\eta^+$, $\eta^-$ are the intermediate variables of the inference formula, $\eta^+$ and $\eta^-$ refer to Formulas (2-8) and (2-9).

Uncertainty Entropy (Entropy): the concept of entropy originated in physics and was used to measure the degree of disorder of a thermodynamic system. In information theory, Shannon entropy was a measurement of uncertainty. In the extended theory of D-S theory of evidence, there was also a large number of studies using entropy to measure the uncertainty of bpa. The present invention reviews and comprehensively compares various measurement methods of bpa entropy, and proposes a new definition of bpa entropy, which is used to measure the total uncertainty entropy of bpa. The present invention uses the total uncertainty entropy to measure the uncertainty of the neural networks, which is defined as follows:

$$a.\ H(m) = \quad (2\text{-}14)$$
$$H_3(\text{pl\_P}_m) + H_d(m) = \Sigma \text{pl\_P}_m(x) \log\left(\frac{1}{\text{pl\_P}_m(x)}\right) + \Sigma m(a) \log(|a|)$$

$$b.\ \text{pl\_P}_m(x_i) = \frac{pl(x_i)}{\sum_{i=1}^{K} pl(x_i)} \quad (2\text{-}15)$$

$$c.\ m(a) = \eta \cdot \eta^+ \cdot \eta^- \cdot \prod_{\theta_k \in a}[1 - \exp(-w_l^-)] \cdot \prod_{\theta_k \notin a}[\exp(-w_l^-)] \quad (2\text{-}16)$$

Wherein, (2-15) and (2-16) are substituted in the Formula (2-14), and the result shows that |a| is the number of elements in subset a; pl\_P$_m$(x) is the probability mass function (normalized plausibility function), the calculation method sees Formula (2-15), pl(x$_k$) is the plausibility function; m(a) is the mass function of the subset of set $\mathcal{C}$, the calculation method is shown in Formula (2-16), $\eta=(1-F)^{-1}$.

m({θ$_k$}) is used to represent the total confidence of the category {θ$_k$} calculated according to the combination rule of DS theory of evidence, wherein the calculation formula is Formula (2-10), wherein $\eta=(1-F)^{-1}$.

a. $m(\{\theta_k\}) =$ (2-10)

$$\eta \cdot \eta^+ \cdot \eta^- \cdot \exp(-w_k^-) \cdot \left\{ \exp(w_k^+) - 1 + \prod_{l \neq k}[1 - \exp(-w_l^-)] \right\}$$

Wherein, $\eta=(1-F)^{-1}$, $\eta^+$ and $\eta^-$ refer to Formulas (2-8) and (2-9);

The first part $H_s(pl\_P_m)$ is the Shannon entropy corresponding to bpa, and the second part $H_d(m)$, calculates the sum of the uncertain entropy assigned to the basic probability of the non-single element set; and the sum of the measurement value of the two parts is the total uncertainty entropy of the neural networks for one sample predictive result. The total uncertainty entropy is used to measure the uncertainty of the model predictive result.

According to the present invention, the structural features of the fully convolutional network are utilized, and an evidence classifier used for neural networks or a Multilayer Perceptron (MLP) is transplanted to various fully convolutional networks used for image semantic segmentation, such as FCN, SegNet and U-Net.

Combining the evidence classifier with the fully convolutional networks used for image semantic segmentation is a method for performing model predictive uncertainty quantification and aid decision making based on the D-S theory of evidence.

Based on evidence inference, three types of uncertainty indexes with clear semantics can be quantified, that is, uncertainty of 'lack of evidence', 'conflict evidence' and 'Shannon entropy' can be distinguished. The method solves the problems of how to quantify the uncertainty of semantic segmentation network model output, how to evaluate the uncertainty of a semantic segmentation network model and how to quantify the credibility of semantic segmentation network model decision making.

In conclusion, according to the method provided by the embodiment of the present invention, a quantification value of the uncertainty can be obtained only through one-time model inference. Compared with the prior art, the method has the advantages that quantification calculation of the semantic segmentation uncertainty can be effectively completed in a short time, and the defects that the calculation amount of a method in the prior art is very large, and inference calculation of the semantic segmentation uncertainty cannot be effectively completed in a short time are overcome. The calculation efficiency is greatly improved, and time and resource cost are saved.

The present invention solves the problems of how to quantify the uncertainty of neural network output, how to evaluate the uncertainty of a semantic segmentation network model and how to quantify the confidence of a neural network decision making, and the effect is remarkable.

In addition, based on evidence inference, three types of uncertainty indexes with clear semantics can be quantified, that is, uncertainty of 'lack of evidence', 'conflict evidence' and 'Shannon entropy' can be distinguished, and more effective support is provided for decision making based on a model predictive value.

Answer: An evidence inference method is adopted in the present invention to extract predictive uncertainty information from a semantic segmentation network model, and an uncertainty quantification index is provided.

In the present invention, combining the evidence classifier with the fully convolutional network used for image semantic segmentation is a method for carrying out model predictive uncertainty quantification and auxiliary decision making based on the D-S theory of evidence.

According to the method, the quantification value of the uncertainty can be obtained only through one-time model inference.

Compared with the prior art, the present invention has the advantages that quantitative calculation of the semantic segmentation uncertainty can be effectively completed in a short time, the calculation efficiency is greatly improved, and the time and resource cost is saved.

The method solves the problems of how to quantify the uncertainty of neural network output, how to evaluate the uncertainty of the semantic segmentation model and how to quantify the credibility of the neural network decision, and the effect is remarkable.

Those of ordinary skill in the art can understand that the drawings are only schematic diagrams of an embodiment, and the modules or processes in the drawings are not necessarily necessary for implementing the present invention.

It can be known from the description of the above embodiments that those skilled in the art can clearly understand that the present invention can be implemented by means of software plus a necessary general hardware platform. Based on this understanding, the technical solution of the present invention or the part that contributes to the existing technology can be essentially embodied in the form of a software product, and the computer software product can be stored in a storage medium, such as ROM/RAM, magnetic disk and CD-ROM, it contains several instructions to make a computer device (which may be a personal computer, a server, or a network device, etc.) execute the methods described in the various embodiments or some parts of the embodiments of the present invention.

The various embodiments in this specification are described in a progressive manner, and the same or similar parts between the various embodiments can be referred to each other, and each embodiment focuses on the differences from other embodiments. In particular, for the device or system embodiment, since it is basically similar to the method embodiment, the description is relatively simple, and the relevant parts can be referred to the part of the description of the method embodiment. The above-described device and system embodiments are merely illustrative, where the units described as separate components may or may not be physically separated, and the components displayed as units may or may not be physical units, that is, they can be located in one place, or they can be assigned to multiple network units. Some or all of the modules can be selected according to actual needs to achieve the objectives of the solutions of the embodiments. Those of ordinary skill in the art can understand and implement without creative work.

The above are only preferred specific embodiments of the present invention, but the protection scope of the present invention is not limited thereto, any person skilled in the art can easily think of changes or changes within the technical scope disclosed in the present invention, and all replacements should be covered within the protection scope of the present invention. Therefore, the protection scope of the present invention should be subject to the protection scope of the claims.

What is claimed is:

1. A semantic segmentation network model uncertainty quantification method based on evidence inference, comprising a non-transitory computer readable medium operable on a computer with memory for the semantic segmentation network model uncertainty quantification method, and comprising program instructions for executing the following steps of:
  i) constructing an FCN network model, and training the FCN network model by using a training data set to obtain a trained FCN network model for semantic segmentation of image data;
  transplanting a D-S theory of evidence to the trained FCN network model to obtain a reconstructed FCN network model;
  ii) inputting to-be-segmented image data into the reconstructed FCN network model, outputting a classification result of a to-be-segmented image by the FCN network model, and calculating a classification result uncertainty value of each pixel point by using the D-S theory of evidence index;
  iii) converting information of a real world into to-be-segmented images for computer visualizing, deep learning and neural network predicting based on the semantic segmentation network model; and
  iv) realizing autonomous driving, drones, meta-universe, virtual reality (VR) and augmented reality (AR) based on results of the semantic segmentation network model uncertainty quantification method.

2. The method according to claim 1, wherein the step of constructing the FCN network model comprises that:
  up sampling/deconvolution operation is performed on feature maps reduced by a convolutional layer and a pooling layer in a convolutional neural network to realize recovery of feature space information and obtain a fully convolutional network FCN network model, and parameters of the FCN network model are trained, wherein the parameters of the FCN network model include an activation value of the feature map and the weight of a filter, parameter layers of the FCN network model are all convolutional layers, the size of a convolution kernel of the last convolutional layer is 1*1, and a fully connected layer of the FCN network model is not used for executing an image segmentation task.

3. The method according to claim 2, wherein the step of training the FCN network model by using the training data set to obtain the trained FCN network model for semantic segmentation of the image data comprises that:
  a known original image data set and label data are obtained, wherein preprocessed images in the original image data set are the same in size m*n, the training data set is formed through the original image data set and the label data, the training data set is input into the FCN network model, and parameters of an optimized classification model are automatically calculated through a loss function to obtain the trained FCN network model used for semantic segmentation of the image data.

4. The method according to claim 3, wherein the step of transplanting the D-S theory of evidence to the trained FCN network model to obtain the reconstructed FCN network model comprises that:
  the D-S theory of evidence is transplanted to the trained FCN network model, and an original evidence pool $m_{jk}$ is obtained through calculation based on the D-S theory of evidence; and then a Dempster combination rule is applied to the original evidence pool $m_{jk}$, confidence $m_1$ and uncertainty measurement indexes of K categories are obtained by calculation, wherein the uncertainty measurement indexes are used for evaluating uncertainty of a predictive result, plausibility transformation is performed on the confidence $m_1$ of the K categories to obtain a normalized plausibility function $P_m$, and an output result $P(C_k)$ of the FCN network model is equivalent to the plausibility function $P_m(C_k)$ obtained based on an evidence inference method so as to obtain the reconstructed FCN network model.

5. The method according to claim 4, wherein the step of inputting the to-be-segmented image data into the reconstructed FCN network model, and outputting the classification result of the to-be-segmented image by the FCN network model comprises that:
  the to-be-segmented image data is input into the reconstructed FCN network model, in case of assuming to segment the to-be-segmented image data into K+1 categories and adding a 'background' category, the last convolutional layer of the FCN network model is set to include K filters, and the size and the number of channels of the last layer of feature maps of the FCN network model are set into $n_H$, $n_W$ and $n_C$ respectively;
  semantic segmentation is performed on the to-be-segmented image data through the reconstructed FCN network model, an activation value $\varphi(X)$ is extracted from the last group of feature maps of the FCN network model, wherein $\varphi(X)$ is an activation value of J dimension ($J=n_H*n_W*n_C$), and meanwhile, the weight w and the bias b of the filter of the last convolutional layer of the FCN network model are extracted; and an original evidence pool $m_{jk}$ are calculated through the activation value $\varphi(X)$, the weight w and the bias b;
  the Dempster combination rule is applied to the original evidence pool $m_{jk}$, and the confidence $m_1$ of the K categories is obtained by calculation, wherein the output result $P(C_K)$ of the FCN network model is as follows:

$$P(C_K) = \text{softmax}(w*\varphi(X)+b) \qquad (1\text{-}19)$$

predictive data of $N*n_H*n_W*n_C*(K+1)$ dimension is obtained, wherein N is the number of input picture samples, $n_H$, $n_W$ and $n_C$ are the size: height, width and number of color channels of an original picture respectively, and K is the classification number of categories.

6. The method according to claim 5, wherein the step of calculating the classification result uncertainty value of each pixel point by using the D-S theory of evidence index comprises that:
  all activation values $\varphi(X)$ of the last layer of feature maps of the FCN model and the weight w and bias b of the filter obtained by training are extracted, wherein in the D-S theory of evidence, the conflict represents the conflict degree between evidences, and a calculation method of the conflict F between two evidences $m_1$ and $m_1$ sees Formula (2-5);

$$a.\ F = \sum_{x \cap y = \emptyset} m_1(x) \times m_2(y) = 1 - \sum_{x \cap y \neq \emptyset} m_1(x) \times m_2(y) \qquad (2\text{-}5)$$

when $F \neq 0$, the orthogonal sum m is also a probability assignment function, and when F=0, there is no orthogonal sum m, and at this time, it is called conflict between $m_1$ and $m_2$; and
the calculation method of the conflict F of the final segmentation result of the to-be-segmented image data sees (2-7), (2-8) and (2-9);

$$a.\ F = \sum_{k=1}^{K} \{\eta + (\exp(w_k^+) - 1)[1 - \eta^- \exp(-w_k^-)]\} \quad (2\text{-}7)$$

$$b.\ \eta^+ = \frac{1}{\sum_{l=1}^{K} \exp(w_l^+) - K + 1} \quad (2\text{-}8)$$

$$c.\ \eta^- = \frac{1}{1 - \prod_{l=1}^{K}[1 - \exp(-w_l^-)]} \quad (2\text{-}9)$$

wherein $w_k^+$ represents positive correlation support of the total weight of the evidences, and $w_k^-$ represents negative correlation support.

7. The method according to claim 6, wherein the step of calculating the classification result uncertainty value of each pixel point by using the D-S theory of evidence index further comprises that:

information ignorance $m(\mathcal{C})$ refers to the basic probability of assigning the complete set $\mathcal{C}$, and the calculation method of $m(\mathcal{C})$ is:

$$a.\ (m_1 \oplus m_2)(\mathcal{C}) = \frac{1}{1-F} \sum_{p \cap q = \mathcal{C}} m_1(p) m_2(q) \quad (2\text{-}13)$$

when $m(\mathcal{C})=1$, the proposition is completely unknown; and the information Ignorance degree $m(\Theta)$ of the final segmentation result of the to-be-segmented image data represents the belief degree that cannot be assigned, and the calculation formula sees Formula (2-11);

$$a.\ m(\Theta) = \eta \cdot \eta^+ \cdot \eta^- \cdot \exp\left(-\sum_{k=1}^{K} w_k\right) \quad (2\text{-}11)$$

wherein $\eta = (1-F)^{-1}$, $\eta^+$ and $\eta^-$ refer to Formulas (2-8) and (2-9).

8. The method according to claim 6, wherein the step of calculating the classification result uncertainty value of each pixel point by using the D-S theory of evidence index further comprises that:

total uncertainty entropy is used for measuring the uncertainty of the neural network, which is defined as follows:

$$a.\ H(m) = \quad (2\text{-}14)$$
$$H_s(\text{pl\_P}_m) + H_d(m) = \sum \text{pl\_P}_m(x) \log\left(\frac{1}{\text{pl\_P}_m(x)}\right) + \sum m(a) \log(|a|)$$

$$b.\ \text{pl\_P}_m(x_i) = \frac{pl(x_i)}{\sum_{k=1}^{K} pl(x_i)} \quad (2\text{-}15)$$

$$c.\ m(a) = \eta \cdot \eta^+ \cdot \eta^- \cdot \prod_{\theta_k \in a}[1 - \exp(-w_i^-)] \cdot \prod_{\theta_k \notin a}[\exp(-w_i^-)] \quad (2\text{-}16)$$

wherein, (2-15) and (2-16) are substituted in the Formula (2-14), and the result shows that $|a|$ is the number of elements in subset $a$; $\text{pl\_P}_m(x)$ is the probability mass function, the calculation method sees Formula (2-15), $pl(x_i)$ is the plausibility function; $m(a)$ is the mass function of the subset of set $\mathcal{C}$, the calculation method is shown in Formula (2-16), $\eta=(1-F)^{-1}$; $m(\{\theta_k\})$ is used to represent the total confidence of the category $\{\theta_k\}$ calculated according to the combination rule of DS theory of evidence, wherein the calculation formula is Formula (2-10), $\eta=(1-F)^{-1}$;

$$a.\ m(\{\theta_k\}) = \quad (2\text{-}10)$$
$$\eta \cdot \eta^+ \cdot \eta^- \cdot \exp(-w_k^-) \cdot \left\{\exp(w_k^+) - 1 + \prod_{l \neq k}[1 - \exp(-w_l^-)]\right\}$$

wherein, $\Theta=(1-F)^{-1}$, $\eta^+$ and $\eta^-$ refer to Formulas (2-8) and (2-9); and the first part $H_s(\text{pl\_P}_m)$ is the Shannon entropy corresponding to bpa, and the second part $H_d(m)$ calculates the sum of the uncertain entropy assigned to the basic probability of the non-single element set; and the sum of the measurement value of the two parts is the total uncertainty entropy of the neural network for one sample predictive result, which is used to measure the uncertainty of the model predictive result.

\* \* \* \* \*